US010710560B2

(12) United States Patent
Prabhakar

(10) Patent No.: US 10,710,560 B2
(45) Date of Patent: Jul. 14, 2020

(54) TRAILER BRAKE CONTROLLER (TBC) FAILSAFE USING DETECTION CAMERA

(71) Applicant: Toyota Motor Engineering & Manufacturing North America, Inc., Plano, TX (US)

(72) Inventor: Varun J. Prabhakar, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/054,978

(22) Filed: Aug. 3, 2018

(65) Prior Publication Data
US 2020/0039487 A1    Feb. 6, 2020

(51) Int. Cl.
*B60T 8/17*    (2006.01)
*B60T 7/20*    (2006.01)

(52) U.S. Cl.
CPC .............. *B60T 8/1701* (2013.01); *B60T 7/20* (2013.01); *B60T 2270/402* (2013.01); *B60T 2270/403* (2013.01)

(58) Field of Classification Search
CPC .... B60T 8/1701; B60T 7/20; B60T 2270/402; B60T 2270/403
USPC .......................................................... 701/70
See application file for complete search history.

(56) References Cited

U.S. PATENT DOCUMENTS

| 6,179,390 | B1  |  1/2001 | Guzorek |
| 6,280,004 | B1  |  8/2001 | Greaves, Jr. |
| 7,021,723 | B1  |  4/2006 | Kaufman |
| 7,311,364 | B2  | 12/2007 | Robertson |
| 2016/0129896 | A1* | 5/2016 | Tu ........................... B60T 8/248 701/70 |
| 2018/0093538 | A1  | 4/2018 | Rothschild |
| 2018/0137380 | A1* | 5/2018 | Alrefai ............... G06K 9/00825 |
| 2018/0257616 | A1* | 9/2018 | Mentzendorff ........... B60T 8/00 |

* cited by examiner

*Primary Examiner* — Yazan A Soofi
*Assistant Examiner* — Naeem Taslim Alam
(74) *Attorney, Agent, or Firm* — Sheppard, Mullin, Richter & Hampton LLP; Hector A. Agdeppa; Daniel N. Yannuzzi

(57) ABSTRACT

Systems and methods enable a failsafe for a trailer brake controller (TBC), by using a camera to detect braking of the towing vehicle. The methods can include using a vehicle-facing camera mounted to a trailer to detecting light emitted from rear brake lights at the towing vehicle. Then, the methods can determine whether the brakes of the towing vehicle are being engaged, based on the light detected by the vehicle-facing camera. Also, a TBC failure can be determined, and as a result, a trailer brake activation signal can be communicated at the trailer side, as a failsafe to activate the brakes of the trailer.

15 Claims, 5 Drawing Sheets

TRAILER BRAKE CONTROLLER (TBC) FAILSAFE USING DETECTION CAMERA

TECHNICAL FIELD

The present disclosure relates generally to systems and methods for controlling trailer brakes. More specifically, systems and methods are disclosed that enable a failsafe for potential trailer brake controller (TBC) failures, by using a camera to detect braking of the towing vehicle.

DESCRIPTION OF RELATED ART

Trailers (e.g., recreational trailers, utility trailers, boat trailers, and the like) may be towed by vehicles (e.g., automobiles and trucks). Some trailers are provided with trailer brakes, such as electric trailer brakes. Electric trailer brakes typically include brake shoes that frictionally engage a drum when activated. In such systems, an electromagnet is typically mounted on one end of a lever in order to actuate the brake shoes. When an electric current is applied to the electromagnet, the lever is pivoted as the electromagnet is drawn against the rotating brake drum, thereby actuating the electric trailer brakes. Some existing electric braking systems include a trailer brake controller (TBC) coupled to the towing vehicle that controls the application of the electric current to the trailer brakes, and thereby controls trailer braking.

BRIEF SUMMARY OF THE DISCLOSURE

In accordance with one embodiment, a method comprises monitoring one or more rear brake lights of a vehicle with a vehicle-facing camera operatively attached to a rear section of the vehicle, and arranged such that the vehicle-facing camera captures activation of the one or more rear brake lights. The method may further detect light emitted from the one or more rear brake lights of the vehicle by the vehicle-facing camera. Further, the method may determine whether the emitted light is indicative of a vehicle braking condition, and upon determining that the emitted light is indicative of a vehicle braking condition, provide a trailer brake activation signal from a controller to engage the brakes of the trailer.

In some embodiments, the method may determine the vehicle braking condition by detecting light emitted from two or more rear brake lights of the vehicle, and light emitted from a third brake light of the vehicle. In some embodiments, the trailer brake activation signal can be triggered by the vehicle-facing camera which occurs in the event of a functioning communicative coupling between a trailer brake controller at the vehicle and the trailer, or in the event of a malfunctioning communicative coupling between the trailer brake controller at the vehicle and the trailer. In some embodiments, the vehicle-facing camera triggering the trailer brake activation signal can serve as a primary control for engaging the brakes of the trailer, and operates independently from the trailer brake controller at the vehicle. the brakes of the trailer, and operates independently from the trailer brake controller at the vehicle. Additionally, in some embodiments the method can provide the trailer brake activation signal by generating an electrical current from a power supply at the trailer that is supplied to the brakes of the trailer, thereby engaging the brakes for deceleration and/or stopping of the trailer.

In accordance with another embodiment, a method comprises monitoring a brake light condition by a front-facing camera mounted to a surface of a non-motorized vehicle and arranged such that a field of view of the front-facing camera is positioned towards a rear region of a motor vehicle. The method may further detect light emitted from at least two brake indication lights situated at the rear region of the motor vehicle, by the front-facing camera, and upon detecting the emitted light by the front-facing camera, determine whether the brake light condition of the at least two brake indication lights is activated in a manner indicative of vehicle braking. Further still, the method may, upon determining that the vehicle is braking, determine whether a brake command signal is sensed from a trailer brake controller at the motor vehicle, and upon determining a failure to sense the brake command signal from the trailer brake controller, provide a non-motorized vehicle brake activation signal as a failsafe to activate the brakes of the non-motorized vehicle.

In some embodiments, the method may determine the failure to sense the brake command signal by failing to sense that the brake command signal is received by the brakes of the non-motorized vehicle in the event of a malfunction of the communicative coupling between the non-motorized vehicle and the trailer brake controller at the motor vehicle. In some embodiments, the method may determine the failure to sense the brake command signal by transmitting a wireless signal from a wireless device at the motor vehicle. Then, the method may receive the wireless signal by a wireless transceiver at the non-motorized vehicle to indicate the failure, and trigger the failsafe to activate the brakes of the non-motorized. In some embodiments, the method may determine the failure to sense the non-motor vehicle brake by transmitting a signal via a wired communication path from a signal detection device at the motor vehicle. Then, the method may receive the signal by the non-motorized vehicle to indicate the failure, and trigger the failsafe to activate the brakes of the non-motorized vehicle.

In yet another embodiment, a system comprises a front-facing camera mounted to a surface of a trailer and arranged such that a field of view of the front-facing camera is positioned towards a rear region of the towing vehicle. The front-facing camera may be configured to: generate images including detected light emitted from one or more rear brake lights at multiple articulation angles. The system may also include a controller device communicatively coupled to the front-facing camera. The controller device may be configured to: analyze the images from the front-facing camera; determine whether the detected light in the images indicates that the one or more rear brake lights are activated in a manner indicative of a vehicle braking condition; upon determining the vehicle braking condition, determine whether a brake command signal is sensed from a trailer brake controller at the vehicle; and upon determining a failure to sense the brake command signal from the trailer brake controller, provide a trailer brake activation signal as a failsafe to engage brakes of the trailer.

In some embodiments, the system may comprise a controller device that is installed at the trailer, and configured to receive signals from a trailer brake controller output detection device installed at the vehicle indicating the failure to sense the brake command signal from the trailer brake controller. In some embodiments, the controller device may be communicatively coupled to the trailer brake controller output detection device independent of a functioning communicative coupling between the trailer brake controller at the vehicle and the trailer. In some embodiments, the controller device may generate an electrical current supplied to the trailer brakes as the trailer brake activation signal. In some embodiments, the trailer output detection device may monitor a communicative coupling between the trailer brake controller at the vehicle, and sense the failure to receive the brake command signal at the brakes of the trailer. In some embodiments, the system includes a wireless transceiver installed at the trailer that may receive wireless signals from the vehicle indicating the failure to sense the brake command signal from the trailer brake controller, and trigger the failsafe at the controller device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The embodiments disclosed herein include systems and methods for implementing a failsafe mechanism for a trailer brake controller (TBC), using a camera installed at the trailer for detecting that the towing vehicle is braking. The disclosed systems and methods can additionally detect that the TBC has failed to activate the trailer brakes, and if towing vehicle braking is detected by the camera, a trailer-side activation of the trailer brakes is triggered as a failsafe. It is common for trailers, such as recreational trailers, to traverse outdoor terrain (e.g., unpaved), or encounter other towing uses that can potentially stress the coupling to the TBC and lead to disconnection, malfunction, or a failure in signaling the trailer brake. Consequently, it may be desirable to provide a failsafe mechanism in conjunction with the TBC that autonomously engages the trailer brakes on the trailer-side in these, and other similar, cases. Accordingly, a need exists for systems and methods that enable a trailer, independent of the vehicle (and the TBC), to detect when the vehicle is braking and subsequently actuate the trailer brakes. As alluded to above, trailers may conventionally incorporate trailer brakes that are controlled by the TBC that is coupled to the towing vehicle. However, if the trailer unintentionally becomes decoupled, for example if the trailer suddenly shakes from hitting a ditch along outdoor terrain, there is the potential that the TBC will fail to actuate the trailer brakes when the vehicle is braking. According to the embodiments, a failsafe trailer brake controller (shown in FIG. 1) can be implemented as a failsafe to the TBC, which is located at the trailer and can assume control of the trailer brakes in the event of detecting a TBC failure. In order to implement the failsafe mechanism, a camera mounted to the trailer may be used to sense a vehicle braking condition, which can be processed by the failsafe trailer brake controller to determine whether to actuate the trailer brakes.

Figure 1:
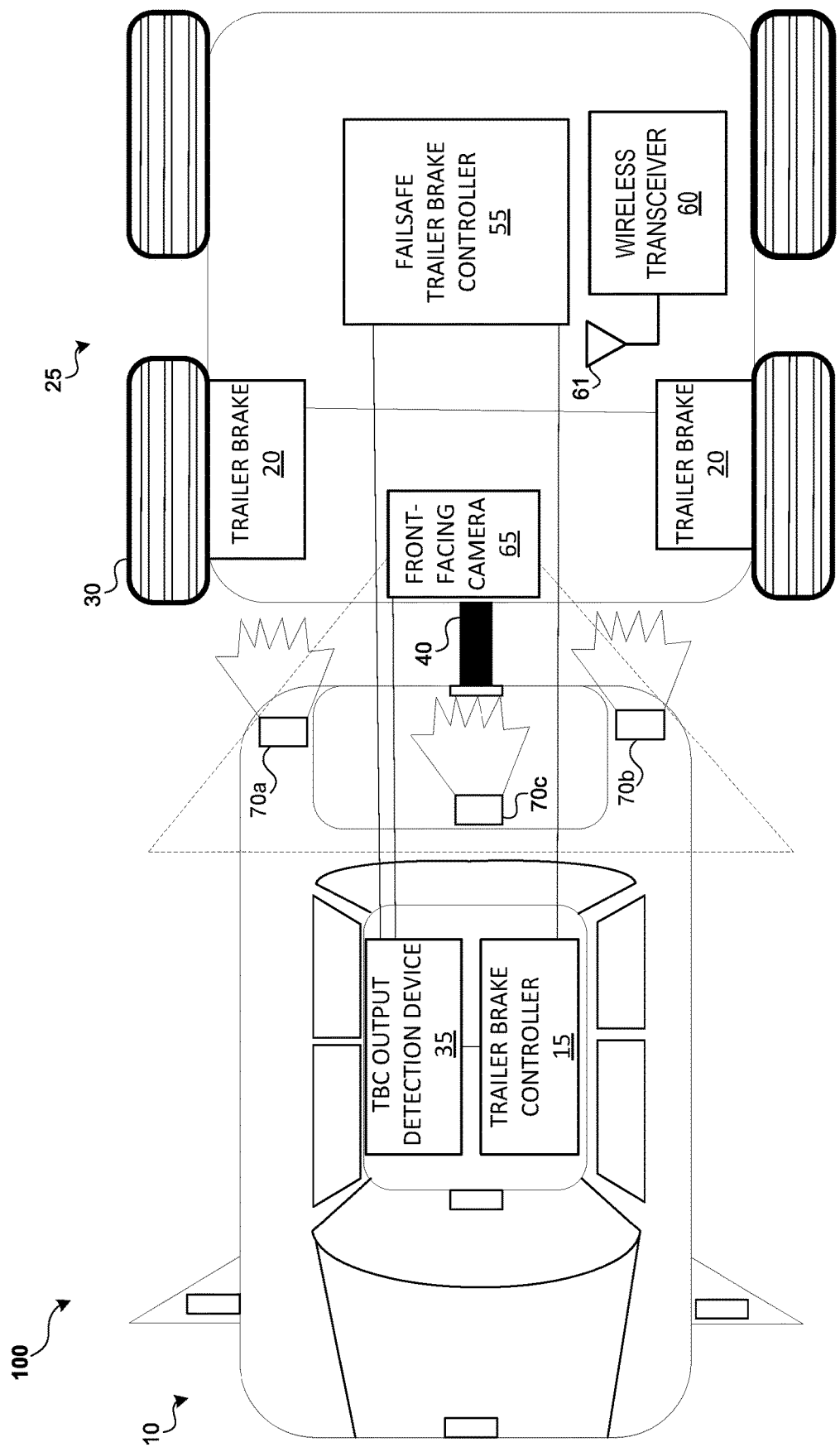
FIG. 1 is a schematic illustrating a towing vehicle coupled to a trailer, and including an example of a trailer braking system using a camera to detect activated vehicle brake lights, and to initiate a failsafe for a trailer brake controller (TBC) according to one or more embodiments shown and described herein.

Referring now to FIG. 1, an example vehicle 10 includes one or more elements of a system 100 serving as a failsafe mechanism for the TBC 15, which engages the trailer brakes 20 of a trailer 25 in the event of a malfunction or unintentional disconnection. As an example, an unintentional disconnection may involve the wiring from a 7-pin connector (described in greater detail below), which can be used to connect the trailer 25 to the TBC 15, coming lose and disrupting the electrical signaling between the components. The vehicle 10 can be a motorized vehicle, such as an automobile or any other passenger or non-passenger vehicle, such as a tractor or tractor truck. The trailer 25 may be an un-powered vehicle (e.g., no motor) including one or more wheels 30, and capable of being pulled by the vehicle 10 for movement. The trailer 25 can be one of many different non-motorized vehicles having varying utilities and sizes, including but not limited to: a recreational trailer; a utility trailer; a boat trailer; a semi-trailer; and the like. In the example illustrated in FIG. 1, the trailer 25 is equipped with two trailer brakes 20. However, it should be understood that in other embodiments, the trailer 25 can include multiple axles with one or more trailer brakes 20 associated with each axle.

As depicted in FIG. 1, the trailer 25 is connected to the vehicle 10 via one or more electro-mechanical connections 40. The connections 40 can include various mechanical components to securely and stably couple (and remove) the trailer 25 to the vehicle 10, such as a hitch and receiver, coupler, cable, and safety chains. The trailer 25 is also electrically coupled to the vehicle 10. In some cases, any power provided to the trailer 25 is supplied by a power supply, such as a battery, of the vehicle 10. For example, the connections 40 can include a plug (not shown) that serves as the electrical coupling to supply electricity from the vehicle 10 to the trailer 25. Moreover, the connections 40 can include a communication path that communicatively couples the trailer 25 and the vehicle 10, as well as the respective components therein. As used herein, the term "communicatively coupled" can mean that coupled components are capable of exchanging data signals with one another such as, for example, electrical signals via conductive medium, electro-magnetic signals via air, optical signals via optical waveguides, and the like. The communication path can be formed by a combination of wired mediums capable of transmitting electrical signals. In one embodiment, the connections 40 comprise a combination of conductive traces, conductive wires, connectors, and buses that cooperate to permit the transmission of the electrical data signals between the trailer 25, vehicle 10, and components. As an example, the connections 40 can be implemented as a seven-pin connector.

FIG. 1 depicts a TBC coupled to the vehicle 10. The TBC 15, although connected to the vehicle 10, can be electrically coupled to the trailer 25, and specifically the trailer brakes 20, by a conductive medium, such as a conductive wire. The TBC 15 can supply a trailer brake command signal, which is a current, to the trailer brakes 20 via the conductive medium. In some embodiments, the TBC 15 may supply current from the power supply of the vehicle 10, such as the vehicle battery (not shown). In the illustrated example, the TBC 15 serves as the primary braking system for activating the trailer brakes 20. For instance, the TBC 15 can determine that the trailer brake 20 is to be activated, in response to sensing that a driver is pressing on the brake pedal to engage the vehicle brakes. The TBC 15 can receive input from one or more sensors or mechanisms, such as accelerometers, a vehicle brake pressure sensing unit, a manual trailer brake activation input (e.g., pushbutton, slider switch, and the like), a vehicle brake light circuit, or combinations thereof. Accordingly, the TBC 15 receives signals signifying that the vehicle 10 is braking, and that the trailer 25, in turn, should brake. In instances when the TBC 15 detects that the vehicle is engaging its brake, the TBC 15 can activate the trailer brakes 20 by supply a trailer brake activation signal via the communicate coupling (e.g., seven-pin connector).

FIG. 1 illustrates the system 100 including a TBC output detection device 35. As shown, the TBC output detection device 35 can be communicatively coupled to the trailer 25 via connections 40. Additionally, the TBC output detection device 35 can be coupled to the TBC 15 via a communication path internal to the vehicle 10, such as a controller area network (CAN) bus. Although FIG. 1 depicts the TBC output detection device 35 as a component installed at (or integrated with) the vehicle 10, it should be appreciated that the device and any of the capabilities thereof can be implemented at the trailer 25. For instance, the TBC output detection device 35 can be modularly coupled to (or integrated with) the failsafe trailer brake controller 55 at the trailer 25.

According to the embodiments, the TBC output detection device 35 can be generally described as a component implementing some aspects of the TBC failsafe techniques disclosed herein. The TBC output detection device 35 is configured to sense, or otherwise detect, whether a brake command signal has been successfully communicated from the TBC 15 to activate the trailer brakes 20. For example, the TBC output detection device 35 can monitor the connections 40 to sense a current supplied by the TBC 15 that is intended to activate the trailer brakes 20. Continuing with the example, the TBC output detection device 35 can include circuitry that detects a voltage drop across a resistor in order to determine the current supplied to the trailer brakes 20, based on the voltage drop. In cases where the TBC output detection device 35 senses no current (or a substantially low current) across the wired electrical connection, an unexpected disconnection from the trailer 25 may be present, thereby preventing the trailer brakes 20 from receiving the brake command signals from the TBC 15. Thus, the scenario potentially arises where a driver of the vehicle 10 is applying the vehicle brakes, but the TBC 15 fails to also engage the trailer brakes 20. In the event that the TBC output detection device 35 detects failed brake command signaling from the TBC 15, the initiation of TBC failsafe actions can be triggered. In some cases, the TBC output detection device 35 communicates a signal to the failsafe trailer brake controller 55 signifying a detected TBC failure event, thereby triggering its TBC failsafe functions.

Moreover, the TBC output detection device 35 can be configured to employ various techniques to detect whether a brake command signal is received from the TBC 15, such as: monitoring for a signal generated by the trailer brakes 20, in response to successfully receiving the command signal from the TBC 15; monitoring for a signal generated by the trailer brakes 20, in response to activating the trailer brakes 20; and monitoring the TBC 15 to detect whether the TBC 15 generates a brake command signal (e.g., malfunctioning of the TBC 15, as opposed to the connections 40). It should be appreciated that the TBC output detection device 35 can be configured to operate in accordance with one any of the aforementioned detection techniques, or any combination thereof, that is deemed suitable for the intended application. For example, to detect faulty electrical wiring and/or an unintended disconnection from the trailer, it may be desirable for the TBC output detection device 35 to monitor signals communication across connections 40.

In an embodiment, wireless communication capabilities of the vehicle 10 can be leveraged to transmit a wireless signal to indicate the TBC 15 failure event to the trailer 25, and thereby triggering the TBC failsafe features of the system 100. FIG. 1 shows that the trailer 25 can include a wireless transceiver 60 with an associated antenna 61. As this example illustrates, communications between the trailer 25 and vehicle 10 can include either, or both, wired communications via the connections 40 and wireless communications via the wireless transceiver 60. In another embodiment, a wireless signal can be transmitted from the vehicle 10 serving as a wireless braking notification, notifying the trailer-side that the vehicle 10 is currently braking. Accordingly, the trailer 25 may not employ the camera-based vehicle brake detection techniques, if the wireless braking notification is received. In other instances, the wireless braking notification from the vehicle 10 can be used as a redundancy to indicate that the vehicle 10 is applying its brakes, in conjunction with the vehicle braking detection using the camera 65. The wireless braking notification may be desirable in instances where light from the brake lights 70a, 70b, 70c cannot be detected by the camera 65 (e.g., bulb shortage, or brake light covered in dirt).

Wireless transceiver 60 can include a transmitter and a receiver to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 61 is coupled to wireless transceiver 60 and is used by wireless transceiver 60 to transmit radio signals wirelessly across wireless channels to wireless equipment at the vehicle 10 with which it is connected and to receive radio signals as well. These RF signals can include information of almost any sort that is sent or received by the TBC output detection device 35 other entities of system 100 using the vehicle wireless systems. There are some existing technologies that can provide wireless communications between a trailer 25 and a vehicle 10 towing the trailer 25, such as trailer tire pressure monitoring system (TPMS), which can be adapted to transmit signals relating to the trailer braking system in order to implement the wireless signaling aspects according to the disclosed embodiments. Employing wireless communication, and the wireless transceiver 60 of the trailer 25, may be advantageous in instances where potential malfunction or disconnection of the wired mediums of connections 40 has occurred.

In some embodiments, the system 100 can utilize the aforementioned wireless capabilities as a communication redundancy feature for the TBC 15. For example, if the TBC output detection device 35 detects a failed transmission of the brake command signal from the TBC 15 (and the vehicle brakes are engaged) along the wired mediums of connections 40, a redundant brake command signal can be wirelessly transmitted. The TBC output detection device 35 can include logic to wirelessly transmit the redundant brake command signal to be received by the transceiver 60, using wireless technology that is already supported by the vehicle 10, such as Bluetooth. As a result, the vehicle 10 can activate the trailer brakes 20 wirelessly, thereby mitigating any problems potentially caused by faulty (or loose) wired connections to the trailer 25.

Still referring to FIG. 1, the system 100 includes a front-facing camera 65. According to the disclosed techniques, the front-facing camera 65 is serving as a vehicle brake detection mechanism that is secondary, or the failsafe, to the TBC 15. That is, the front-facing camera 65 continues to function without a communicative coupling to the vehicle 10, and in a manner, that can be independent of the TBC 15. By utilizing the front-facing camera 65 that is mounted onto the trailer 25, the trailer 25 can be aware of braking at the vehicle 10 even if the TBC 15 (or connection thereto) fails.

The front-facing camera 65 is shown to be physically coupled to the trailer 25. For example, the front-facing camera 65 can be installed by using an attachment for mounting to a front portion of the trailer 25, and arranged such that a lens of the camera 65 is facing forward in the direction of the vehicle 10 (e.g., away from the trailer 25). In accordance with the embodiments, the front-facing camera 65 is arranged such that the imaged field of view includes multiple brake lights 70*a*-70*c* of the vehicle 10, at multiple articulation angles that may be experience by the trailer 25 during towing. In some cases, the front-facing camera 65 can be positioned allowing the field of view (represented with dashed lines) to be at an angle that generally covers the entire rear region of the vehicle 10. The front-facing camera 65 can be implemented as a wide-angle camera for achieving the desired imaged field of view. It should be appreciated that the placement of the front-facing camera 65 in FIG. 1 is for purposes of illustration, and that various characteristics of the front-facing camera 65 such as position, distance (from the vehicle 10), orientation, angle, resolution, and the like can be adjusted as desired and according the specific application. For instance, a larger towing vehicle 10 may require the front-facing camera 65 to be placed at a different location on the trailer 25 than shown in FIG. 1 (e.g., farther distance from the vehicle 10). Although the example of FIG. 1 illustrates the front-facing camera 65, it should be appreciated that a plurality of cameras 65 can be employed to perform the braking detection and failsafe mechanisms described herein.

The front-facing camera 65 can also be electrically coupled to the trailer 25 (and the components therein), and further communicatively coupled to the vehicle 10 and its components. The front-facing camera 65 can employ a wired and/or wireless communicative coupling to the vehicle 10 and trailer 25. The front-facing camera 65 can transform light in the imaged field view that is incident on an image sensor of the camera 65 into electrical signals indicative of the imaged field of view. It should be appreciated that the front-facing camera 65 may be implemented as any device capable of detecting visible light, radiation in an ultraviolet wavelength band, or an infrared wavelength band. For instance, a photodetector can be employed in system 100, which is capable of detecting light and associated characteristics, such as source of the light, direction of the light, location of the source relative to the sensor, light intensity, and the like. The front-facing camera 65 may be of any resolution deemed appropriate or necessary.

In operation, the front-facing camera 65 can passively monitor the brake lights 70*a*, 70*b*, 70*c* using its imaging capabilities (e.g., photo or video), and further includes logic to determine whether the brakes lights 70*a*,70*b*,70*c* are activated simultaneously, thereby indicating that the vehicle is braking. As an example, when a driver of the vehicle 10 presses a brake pedal (e.g., engaging the vehicle brakes), the brake lights 70*a*, 70*b*, 70*c* include circuitry that receive signals to illuminate in response, causing light to be emitted from each of the brake lights 70*a*, 70*b*, 70*c* at once. Rear brake lights 70*a*, 70*b* (commonly referred to as taillights) can comprise an outer plastic lens which is divided into a number of segments including a peripheral segment and multiple side-by-side contiguous internal segments. Light emitting diodes (LEDs) can be disposed within these segments to create illumination within the segments which is transmitted through the lens to the rear of the vehicle 10 to inform following drivers to the degree of deceleration experienced by the vehicle 10 as indicated by the output signal from an accelerometer, for example, hi some cases, different segments of the brake lights, 70*a* and 70*b* are illuminated, and different timed illumination patterns (e.g., blinking) can be used (in combination) to indicate other driving conditions, such as hazards and turning, A vehicle 10 having both rear lights 70*a*, 70*b*, and/or third brake light 70*c* activated simultaneously indicates to surrounding drivers that the vehicle 10 is braking. However, the rear brake lights 70*a*, 70*b* might be illuminating for a purpose other than braking, such as turn-signaling. In the embodiments, the front-facing camera 65 accomplishes vehicle brake detection by having the capability to properly identify when activated brake lights 70*a*,70*b*, 70*c* signify that the brakes of the vehicle 10 are being engaged (as opposed to other purposes).

In an embodiment, the front-facing camera 65 is calibrated allowing it to distinguish between brake activation and turn-activation of the brake lights 70*a*, 70*b*, 70*c*. As an example, the camera 65 can be exposed to a calibration process, where it captures images from multiple instances of activating the rear brake lights 70*a*, 70*b* by applying the brakes at the vehicle 10. The images captured during calibration can be analyzed to identify characteristics of the light, that may be particularly indicative of braking (e.g., light intensity, length of illumination).

The front-facing camera 65 can detect an activated light, which is "turned-on" to illuminate (or emit light). Using imaging, the front-facing camera 65 can detect light emitted from the rear brake lights 70*a*, 70*b* (e.g., left, right) of the vehicle 10. Additionally, the front-facing camera 65 can detect illumination of brake light 70*c*, which is referred to herein as the third brake lights. The third brake lights 70*c* is commonly situated above the rear brake lights 70*a*, 70*b* to have more visibility (e.g., in the line-of-sight for other drivers) for the drivers of vehicles following behind. For example, the top brake light 70*c* can be mounted in the trunk lid, on a spoiler, or inside of a rear windshield of the vehicle 10 to be easily seen over the hood-line of a following vehicle. The front-facing camera 65 is implemented with a vehicle brake detection logic, which analyzes the images generated by camera 65 to detect whether the brakes lights 70*a*, 70*b* are activated simultaneously (e.g., indicating that a brake light condition is occurring). By performing this check, the detection techniques can distinguish between instances when the brake lights 70*a*, 70*b* are activated for braking, from other scenarios where a single light may be "on", like a turn-signal. Accordingly, the disclosed techniques can improve the overall accuracy of camera-based vehicle brake detection. In some cases, the vehicle brake detection logic can check for an activation of the third brake light 70c as a redundancy to brake lights 70a, 70b. Restated, if both rear brake lights 70a, 70b are illuminating, the logic can then check whether the top brake light 70c is also "turned-on" to confirm that the vehicle 10 is braking. Alternatively, the vehicle brake detection logic can use any combination of brake lights 70a,70b,70c, in its determination of whether the vehicle 10 is braking. For example, the logic can determine that brakes of the vehicle 10 are engaging, when at least two of the brake lights 70a, 70b, 70c are emitting light at once. In some cases, the logic can determine that the vehicle 10 is braking, solely based on detecting light from the third brake light 70c, as this light is typically only activated for braking. It should be appreciated that although the vehicle brake detection functions are described as logic implemented by the front-facing camera 65, these functions can be implemented (either partially or in whole) by other components of the system 100 as deemed necessary or appropriate. For example, in some embodiments, the failsafe trailer brake controller 55 can perform the vehicle brake detection function.

In some embodiments, detection of the vehicle braking can be determined using factors other than (or in addition to) the simultaneous illumination of rear brake light 70a, 70b and illumination of the third light 70c, as described above. For instance, a vehicle brake condition can be premised on illumination timing. In the case of illumination timing, detection logic can determine that the vehicle 10 is not braking if a synchronous illumination of the rear brake lights 70a, 70b having short-timing durations (e.g., blinking) is identified. As alluded to above, blinking lights may be indicative of other functions, such as hazards lights, or turn-signals. Alternatively, the brake logic can determine that the vehicle 10 is braking if the rear brake lights 70a, 70b remain illuminated for certain durations (e.g., 5 seconds).

In some embodiments, a failsafe trailer brake controller 55 can assume control of the trailer brakes 20 after a TBC failure has been detected. Due to the failsafe trailer brake controller 55, the trailer 25 can signal itself to brake, irrespective of the proper functioning of the TBC 15 and/or connection to the vehicle 10. In an example, the failsafe trailer brake controller 55 may receive signals from the TBC output detection device 35 indicating that a brake command signal from the TBC 15 failed, thereby allowing the failsafe trailer brake controller 55 to be aware that some malfunction and/or disconnection of . . . what elements has occurred. In turn, a braking failsafe may be required. The failsafe trailer brake controller 55 can be configured to communicate with one or more other components of system 100 (via the various communication paths) to determine a failsafe condition. A failsafe condition can generally be described as when the vehicle 10 is braking, but the trailer brakes 20 are not activating. In some cases, the trailer braking controller 55 can receive signals from the front-facing camera 65 indicating that vehicle 10 has been detected as braking. The controller 55 can compare signals from the front-facing camera 65 to signals from the TBC output detection device 35 (indicating that the TBC 15 has failed to activate the trailer brakes 20), in order to determine whether the trailer brakes 20 should be activated independent of the TBC 15. Thus, based on a determination that the trailer brakes 20 should be activated, the failsafe trailer brake controller 55 can initiate failsafe actions according to the embodiments. The failsafe brake controller 55 can include circuitry enabling a trailer brake activation signal to be generated by the controller 55, and provided the trailer brakes 20, as a failsafe to the TBC 15. The failsafe trailer brake controller 55 can be communicatively and/or electrically coupled to the trailer brakes 20, by a conductive medium such as a conductive wire. The failsafe trailer brake controller 55 can include processing and/or memory capabilities allowing the controller to execute logic that controls the failsafe features of the embodiments, and supplies an electrical signal to activate the trailer brakes 20 as triggered by the failsafe. In some embodiments, the failsafe trailer brake controller 55 may receive power supplied from a power system of the vehicle 10.

Figure 2:
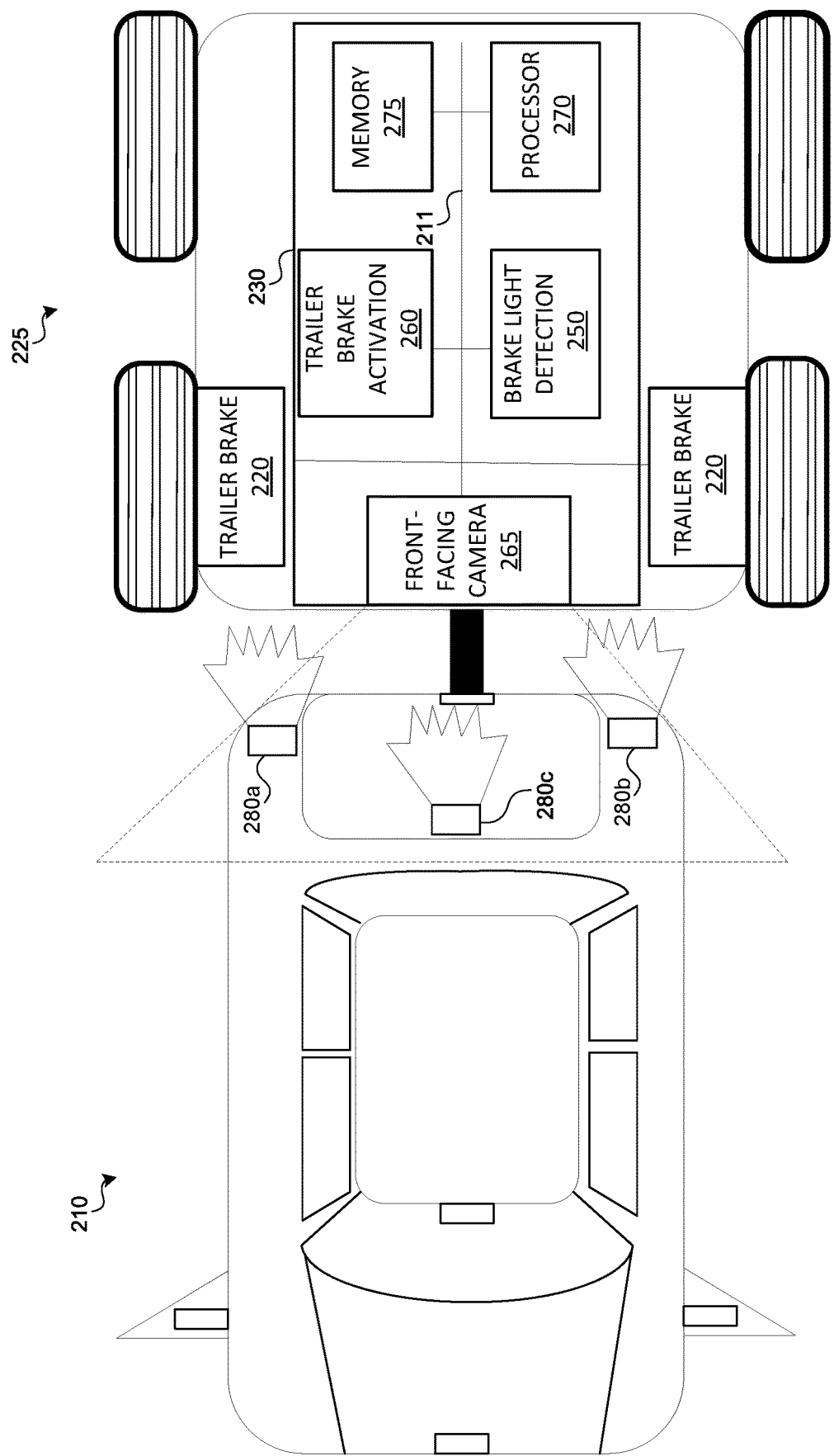
FIG. 2 is a schematic illustrating a towing vehicle coupled to a trailer, and including an example of stand-alone system using a camera to detect activated vehicle brake lights and to initiate a trailer-side activation of the trailer brakes, where the stand-alone system operates as a primary braking system (independent of TBC coupled to the vehicle) according to one or more embodiments shown and described herein.

FIG. 2 is a schematic illustrating a vehicle 210 coupled to a trailer 225, where the trailer 225 includes a stand-alone system 230 which operates as a primary braking system (independent of a TBC coupled to the vehicle) according to one or more embodiments. FIG. 2 serves to illustrate that the main components and functions of the previously described failsafe system are integrated into the stand-alone system 230 installed at the trailer 225. For example, the stand-alone system 230 can various element structurally combined as a single device that can be mounted to, or otherwise installed at, the trailer 225. In some cases, the stand-alone system 230 includes a power supply, which enables the system 230 to generate electrical signals and power components without being connected to a power supply of the vehicle 210. Thus, the trailer 225 has the capability to signal itself to activate the trailer brakes 220, based on a vehicle brake detection that can be performed solely by the trailer 225 on the components installed thereon. In some cases, the stand-alone system 230 is not physically housed in single device, but can be maintain a modular design, where each component is coupled to the trailer 225.

The stand-alone system 230 of the embodiments provides improvements over some existing trailer braking mechanisms that rely on maintaining the electro-mechanical connections to the towing vehicle 210, and on proper brake signaling from the TBC, for the trailer 225 to brake. As a general description, the stand-alone system 230 is capable of performing all of the camera-based brake detection functions discussed in detail in reference to FIG. 1 using primarily: the front-facing camera 265 using imaging to detect light emitted from the brake lights 280a, 280b, 280c; and the brake detection module 250 to determine the braking condition based on analyzing the imaging. It should be appreciated that FIG. 2 shows that the vehicle brake detection functions are implemented using the components of the stand-alone system 230.

Additionally, the stand-alone system 230 is capable of performing all of the trailer brake activation functions discussed in reference to the TBC failsafe shown in FIG. 1, using primarily the trailer brake activation module 260. For example, the trailer brake activation module 260 can provide a signal to the processor 270 that may be processed in order to determine whether the trailer brakes 220 are to be activated (also based partially on signals from the brake detection module 250) and then supply an electrical signal that functions to engage the trailer brakes 220, when braking the trailer 225 is deemed necessary.

The stand-alone system 230 is shown to include at least one processor 270, which may be any device capable of executing machine readable instructions implementing the techniques described herein. Accordingly, the processor 270 may be a controller, an integrated circuit, a microchip, a computer, or any other computing device. The processor 270 is communicatively coupled to the other components of the system 230 by the communication path 211. Accordingly, the communication path 211 may communicatively allow the components coupled to the communication path 211 to operate in a distributed computing environment. Specifically, each of the components may operate as a node that may send and/or receive data.

The stand-alone system is also shown to include at least one memory 275 that is coupled to the communication path 211 and communicatively coupled to the processor 270. The memory 275 may comprise RAM, ROM, flash memories, hard drives, or any device capable of storing machine readable instructions such that the machine-readable instructions can be accessed and executed by the processors 270. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Additionally, the stand-alone system 230 includes the communication path 211 that may be formed from any medium that is capable of transmitting a signal such as, for example, conductive wires, conductive traces, optical waveguides, or the like. Moreover, the communication path 211 may be formed from a combination of mediums capable of transmitting signals. In one embodiment, the communication path 211 comprises a combination of conductive traces, conductive wires, connectors, and buses that cooperate to permit the transmission of electrical data signals to components such as processors, memories, sensors, input devices, output devices, and communication devices. Accordingly, the communication path 211 may comprise a towing vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 211 communicatively couples the various components of the system 230.

Figure 3:
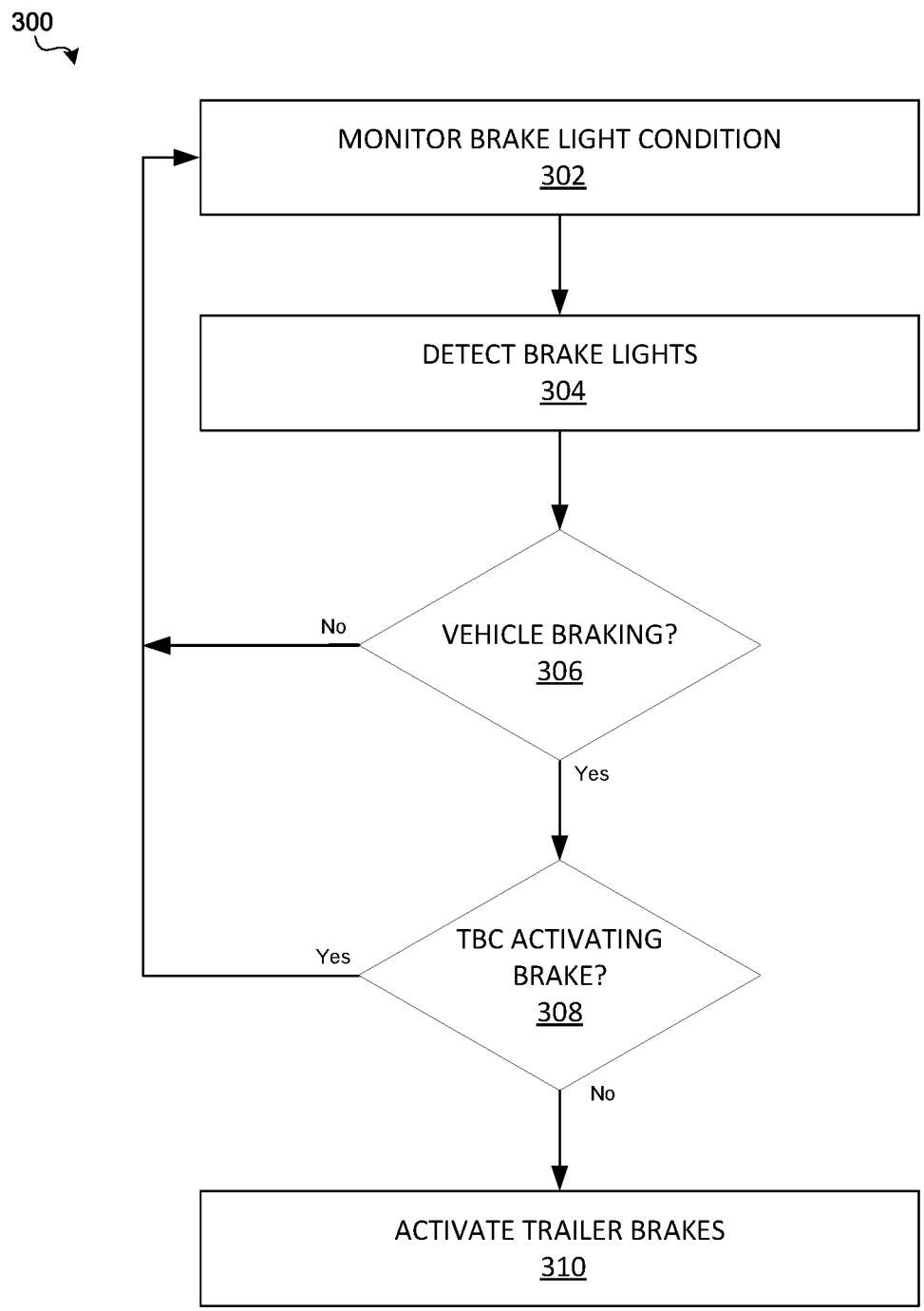
FIG. 3 is a flow chart illustrating example operations for implementing a failsafe to the TBC, and using a camera to detect brake lights and engage the trailer brakes in accordance with one embodiment.

FIG. 3 is a flow chart illustrating example operations for implementing a failsafe to the TBC, and using a camera to detect brake lights and engage the trailer brakes in accordance with one embodiment. As described above in conjunction with FIG. 1, effects of a potential malfunction and/or disconnection of a TBC at a towing vehicle can be mitigated by employing the detection and TBC failsafe techniques discloses herein. The process 300 begins at operation 302, where a camera can be employed to monitor a brake light condition, of multiple brakes lights of the towing vehicle. In some examples, the front-facing camera can be mounted to an external surface of a trailer, or non-motor vehicle. In an embodiment, a truck bed view camera, or cargo detection camera can be used. Nonetheless, any camera employed for monitoring at operation 302 is preferably arranged in such that a field of view of the camera is positioned towards a rear region of a towing vehicle, or motor vehicle. Monitoring at operation 302 can involve a front-facing camera using its imaging capabilities to continuously image a field of view (encompassing the rear region of the vehicle), as a mode of passively monitoring for any activation of brake lights at the vehicle. Alternatively, monitoring at operation 302 can be triggered by an event, such as a driver stepping on a brake pedal at the towing vehicle.

Next, at operation 304, the camera can detect light emitted from brake indication lights, or brake lights. Referring back to the example, if the brake pedal is pressed at the vehicle, the camera can be triggered to start imaging, and then analyze those images to detect whether brake lights are illuminating. According to the embodiments, the light detection at operation 304 is performed for at least two brake lights at the vehicle situated at the rear of the vehicle. In other embodiments, detection must be performed for three brake indication.

Thereafter, a determination is made at operation 306, involving whether the emitted light detected by the front-facing camera indicates that the brake lights that have been activated from braking (as opposed to turning). The determination can include checking whether at least two brake lights are activated, or emitted light, simultaneously. In cases where the camera detects light emitting from both two brake lights ("Yes"), it indicates that the brake lights are "on" due to the brakes being engaged for deceleration and/or stopping the vehicle. Then, the process 300 proceeds to operation 308. Alternatively, when it is determined that only one brake light is illuminating ("No"), the brake light may be activated for a purpose other than braking, such as a turn-signal. In this case, the process 300 returns to operation 302 to continue to monitor for braking. Accordingly, the techniques can confirm that the camera has detected braking at the vehicle, reducing the risk of false positives, and making the trailer components aware that the trailer should be braking. In some embodiments, the determination at operation 306 is performed by logic implemented at the camera. In other embodiments, camera-based vehicle brake detection operations are executed by one or more other components, such as a failsafe trailer brake controller (shown in FIG. 1).

Subsequently, upon detecting that the brake lights are activated due to the vehicle braking, another determination is made at operation 308, involving whether the TBC is activating the brake. In some cases, operation 308 employs circuitry that can sense electrical characteristics of the brake command signals, such as a current, to detect the presence (or successful transmission) of the signal from the TBC, as it is communicated via a wired connection. Thus, operation 308 determines whether the TBC is attempting to transmit a brake command signal that is not reaching the trailer brakes (e.g., trailer side). Therefore, the operation 308 may be indicative of a faulty wiring, or a disconnection of the trailer from the vehicle. In some cases, the determination at operation 308 involves sensing whether the TBC generates a brake command signal altogether, which may be indicative that the TBC has malfunctioned (as opposed to the connection). In the case where is it determined that the vehicle is braking, but the TBC is not activating the trailer brakes ("No") constitutes a failsafe condition according to the embodiments. The trailer components are aware that there is a TBC failure, thereby triggering the failsafe actions at operation 310. In some embodiments, a signal indicating that a TBC failure has been determined is received from a component to trigger the failsafe aspects. For example, the TBC output device 35 sends a signal to the trailer indicating that the TBC has failed. The TBC failure indication signal can be transmitted wirelessly, in some embodiments.

Next, the process proceeds to operation 310, where the trailer executes a failsafe, and activates the trailer brakes despite not receiving the signals from TBC. According to an embodiment, the operation at 310 includes transmitting a trailer brake activation signal which engages the trailer brakes, and results in the trailer signaling to itself to brake (as the vehicle braking is detected).

Referring back to operation 308, in the case where the TBC activates the trailer brakes ("Yes"), which indicates that the TBC is, in fact, functioning properly, there trailer is braking and there is no need to execute the failsafe techniques. As a result, the process 300 returns to operation 302.

Figure 4:
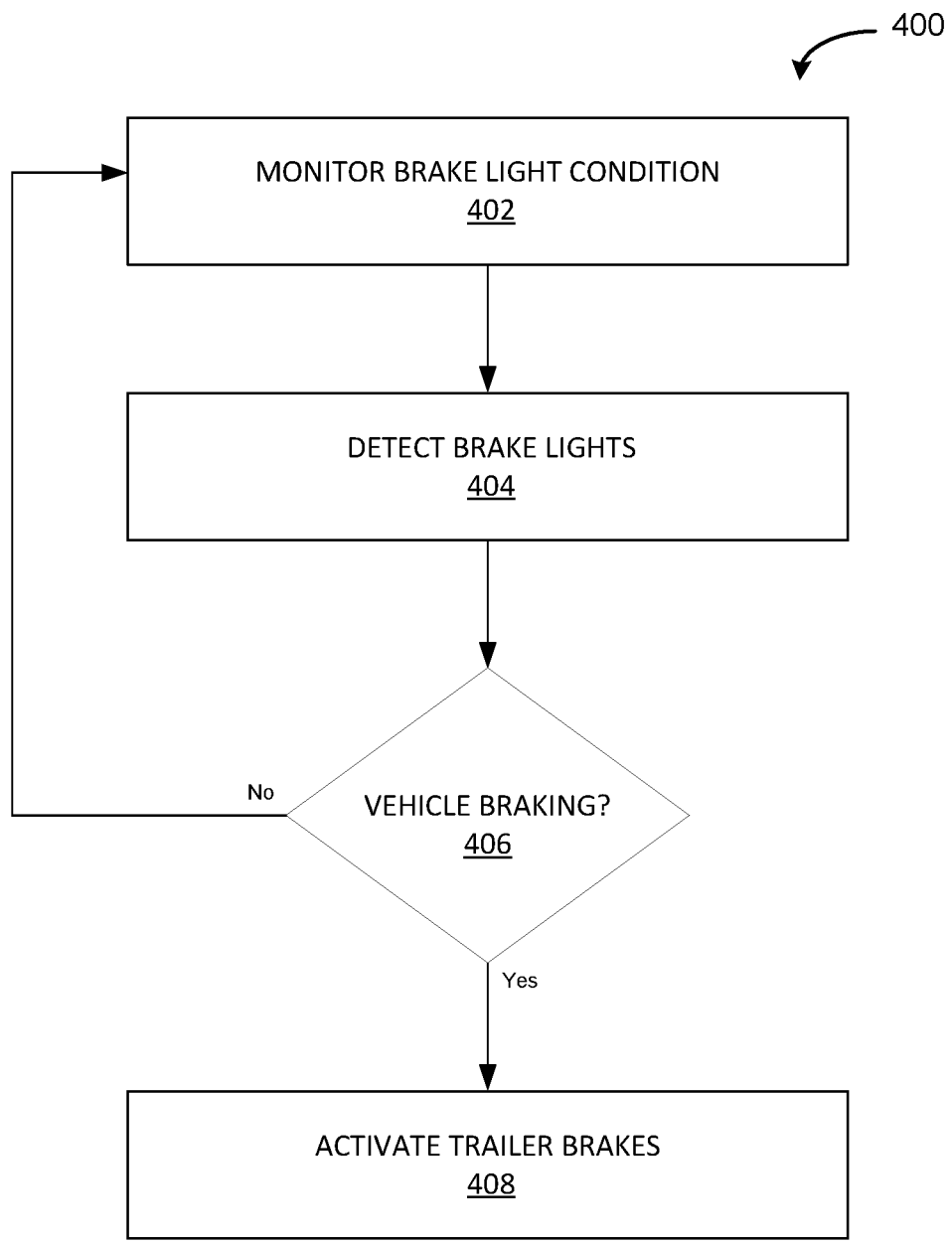
FIG. 4 is a flow chart illustrating example operations for implementing trailer braking independent of the TBC, and using a camera to detect brake lights and engage the trailer brakes in accordance with one embodiment.

FIG. 4 is a flow chart illustrating example operations for implementing trailer braking, that may be performed independent of the TBC. As described above in reference with FIG. 2, the vehicle brake detection and trailer braking techniques disclosed herein can be performed autonomously by the trailer, that is without the intervention of the vehicle or the TBC (e.g., no communicative coupling required between trailer and towing vehicle). In some cases, the functionality of process 400 is implemented as a stand-alone system (relative to the vehicle). The stand-alone system (shown in FIG. 2) can be installed and executed entirely at the trailer side, eliminating the need for the trailer to be connected to the vehicle in order to activate the trailer brakes.

According to this embodiment, process 400, which uses camera triggered trailer braking, can be implemented as a primary trailer braking mechanism, rather than a failsafe that is used in conjunction with the TBC (shown in FIG. 3). The process 400 involves camera-based vehicle brake detection in operations 402-406. The vehicle brake detection techniques are substantially similar to those discussed in reference to FIG. 3. For purposes of discussion, the steps are generally described again here in reference to FIG. 4. At operation 402, a front-facing camera mounted on the trailer can be employed to monitor for the condition of brake lights at the towing vehicle. Next, at operation 404, the font-facing camera can detect light that may be emitted by activated brake lights. Thereafter, a determination is made at operation 406, involving whether the light detected by the front-facing camera indicates that the brake lights that have been activated from braking (as opposed to a turn-signal).

If the process 400 detects that the vehicle is braking ("Yes"), it indicates that the brake lights are "on" due to the brakes being engaged for deceleration and/or stopping the vehicle. Then, the process 400 proceeds to operation 408. Alternatively ("No"), the process 400 returns to operation 402 to continue to monitor the brake lights.

Next, at operation 410, the trailer has detected that the vehicle is braking, and in response, activates the trailer brakes. According to an embodiment, the operation at 410 includes transmitting a trailer brake activation signal which engages the trailer brakes, and results in the trailer signaling to itself to brake (as vehicle braking is detected). Consequently, process 400 activates the trailer brake essentially using the camera (which is a trailer component), rather than being dependent on the TBC that may be susceptible to the trailer communicatively (or physically) disconnecting from the vehicle.

Figure 5:
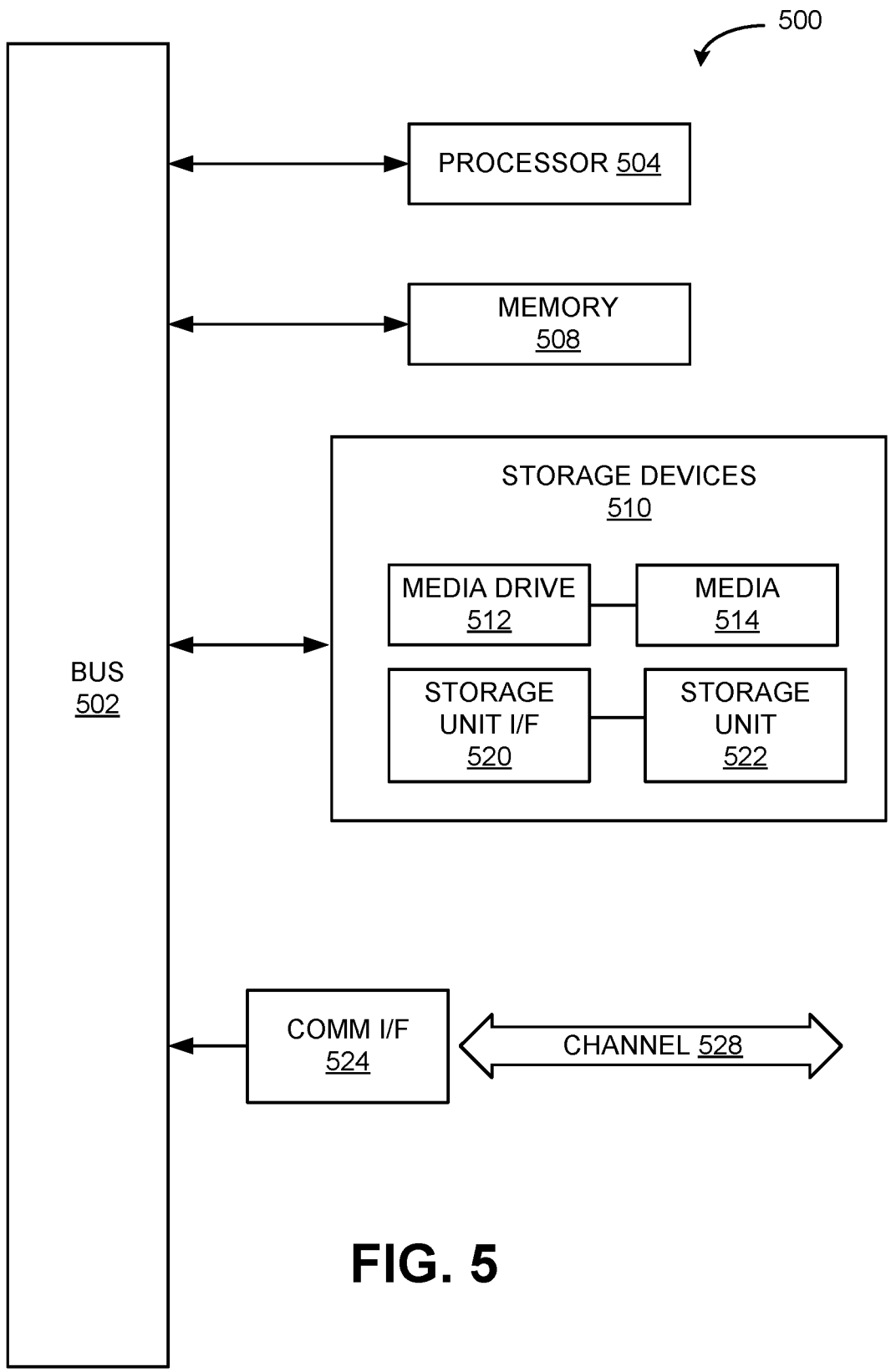
FIG. 5 illustrates an example computing component that may be used in implementing various features of embodiments of the disclosed technology.

Referring now to FIG. 5, computing device 500 may represent, for example, computing or processing capabilities found within many computer processing devices. In an embodiment, the failsafe trailer brake controller (shown in FIG. 1) can be implemented as the computing device 500. Moreover, a computing device 500 can be configured to implement various aspects, at least in part, of the TBC failsafe and camera-based vehicle brake detection. Computing device 500 can be implemented as a desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1 and 2 and described herein. Computing device 500 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing device 500 might include, for example, one or more processors, controllers, control modules, or other processing devices, such as a processor 504. Processor 504 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 504 is connected to a bus 502, although any communication medium can be used to facilitate interaction with other components of computing device 500 or to communicate externally.

Computing device 500 might also include one or more memory modules, simply referred to herein as main memory 508. For example, in some embodiments random access memory (RAM) or other dynamic memory, might be used for storing information and instructions to be executed by processor 504. Main memory 508 might also be used for storing temporary variables or other intermediate information during execution of instructions to be executed by processor 504. Computing device 500 might likewise include a read only memory ("ROM") or other static storage device coupled to bus 502 for storing static information and instructions for processor 504.

The computing device 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), a flash drive, or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing device 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a flash drive and associated slot (for example, a USB drive), a PCMCIA slot and card, and other fixed or removable storage units 522 and interfaces 520 that allow software and data to be transferred from the storage unit 522 to computing device 500.

Computing device 500 might also include a communications interface 524. Communications interface 524 might be used to allow software and data to be transferred between computing device 500 and external devices. Examples of communications interface 524 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features and/or functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. In this document, the terms "computer program medium" and "computer usable medium" are used to generally refer to transitory or non-transitory media. Such media may be, e.g., memory, storage unit, media, and channel. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time.

Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   monitoring one or more rear brake lights of a towing vehicle with a vehicle-facing camera operatively attached to a front section of a trailer, and arranged such that the vehicle-facing camera captures activation of the one or more rear brake lights of the towing vehicle;
   detecting light emitted from the one or more rear brake lights of the towing vehicle by the vehicle-facing camera;
   determining whether the emitted light is indicative of a towing vehicle braking condition; and upon determining that the emitted light is indicative of the towing vehicle braking condition, providing a trailer brake activation signal from a controller to engage the brakes of the trailer.

2. The method of claim 1, wherein determining the towing vehicle braking condition comprises detecting light emitted from two or more rear brake lights of the towing vehicle, and light emitted from a third brake light of the towing vehicle.

3. The method of claim 1, wherein providing the trailer brake activation signal comprises a triggering by the vehicle-facing camera which occurs in the event of a functioning communicative coupling between a trailer brake controller at the towing vehicle and the trailer, or in the event of a malfunctioning communicative coupling between the trailer brake controller at the towing vehicle and the trailer.

4. The method of claim 3, wherein the triggering by the vehicle-facing camera serves as a primary control for engaging the brakes of the trailer, and operates independently from the trailer brake controller at the towing vehicle.

5. The method of claim 1, wherein providing the trailer brake activation signal comprises generating an electrical current from a power supply at the trailer that is supplied to the brakes of the trailer, thereby engaging the brakes for deceleration and/or stopping of the trailer.

6. A method comprising:
monitoring a brake light condition by a front-facing camera mounted to a surface of a non-motorized vehicle and arranged such that a field of view of the front-facing camera is positioned towards a rear region of a motor vehicle;
detecting light emitted from at least two brake indication lights situated at the rear region of the motor vehicle, by the front-facing camera;
upon detecting the emitted light by the front-facing camera, determining whether the brake light condition of the at least two brake indication lights is activated in a manner indicative of the motor vehicle braking;
upon determining that the motor vehicle is braking, determining whether at least one brake command signal is sensed from a trailer brake controller at the motor vehicle via at least one brake connection between the non-motorized vehicle and the motor vehicle; and
upon determining a failure to sense at least one brake command signal from the trailer brake controller indicating no operable brake connection between the non-motorized vehicle and the motor vehicle, providing a non-motorized vehicle brake activation signal as a failsafe to activate the brakes of the non-motorized vehicle.

7. The method of claim 6, wherein determining the failure to sense the brake command signal comprises failing to sense the brake command signal being received by the brakes of the non-motorized vehicle in the event of a malfunction of the communicative coupling between the non-motorized vehicle and the trailer brake controller at the motor vehicle.

8. The method of claim 7, wherein determining the failure to sense the non-motorized vehicle brake command signal comprises:
transmitting a wireless signal from a wireless device at the motor vehicle; and
receiving the wireless signal by a wireless transceiver at the non-motorized vehicle to indicate the failure, thereby triggering the failsafe to activate the brakes of the non-motorized.

9. The method of claim 7, wherein determining the failure to sense the non-motor vehicle brake command signal comprises:
transmitting a signal via a wired communication path from a signal detection device at the motor vehicle; and
receiving the signal by the non-motorized vehicle to indicate the failure, thereby triggering the failsafe to activate the brakes of the non-motorized vehicle.

10. A system, comprising:
a front-facing camera mounted to a surface of a trailer and arranged such that a field of view of the front-facing camera is positioned towards a rear region of a towing vehicle, the front-facing camera configured to:
generate images including detected light emitted from one or more rear brake lights of the towing vehicle at multiple articulation angles; and
a controller device communicatively coupled to the front-facing camera, the controller device configured to:
analyze the images from the front-facing camera;
determine whether the detected light in the images indicates that the one or more rear brake lights of the towing vehicle are activated in a manner indicative of a vehicle braking condition;
upon determining the towing vehicle braking condition, determine whether at least one brake command signal is sensed from a trailer brake controller at the towing vehicle, wherein sensing the at least one brake command indicates at least one operable brake connection between the towing vehicle and the trailer; and
upon determining a failure to sense the at least one brake command signal from the trailer brake controller at the towing vehicle as an indication of no operable brake connection between the towing vehicle and the trailer, provide a trailer brake activation signal as a failsafe to engage brakes of the trailer.

11. The system of claim 10, wherein the controller device is installed at the trailer, and configured to receive signals from a trailer brake controller output detection device installed at the towing vehicle indicating the failure to sense the brake command signal from the trailer brake controller.

12. The system of claim 11, wherein the controller device is communicatively coupled to the trailer brake controller output detection device independent of a functioning communicative coupling between the trailer brake controller at the towing vehicle and the trailer.

13. The system of claim 10, wherein the controller device is configured to generate an electrical current supplied to the trailer brakes as the trailer brake activation signal.

14. The system of claim 10, wherein the trailer output detection device is configured to monitor a communicative coupling between the trailer brake controller at the towing vehicle, thereby sensing a failure to receive the brake command signal at the brakes of the trailer.

15. The system of claim 10, comprising a wireless transceiver installed at the trailer configured to receive wireless signals from the towing vehicle indicating the failure to sense the brake command signal from the trailer brake controller, thereby triggering the failsafe at the controller device.

* * * * *